US011162561B2

(12) United States Patent
Mueller

(10) Patent No.: US 11,162,561 B2
(45) Date of Patent: Nov. 2, 2021

(54) HEAVY-DUTY SHACKLE

(71) Applicants: SCHMIEDESTUECK-VERTRIEB FEUERSTEIN GMBH, Hattingen (DE); VAN BEEST GROUP B.V., AB Sliedrecht (NL)

(72) Inventor: Stefan Mueller, Dortmund (DE)

(73) Assignees: Schmiedestueck-Vertrieb Feuerstein GmbH, Hattingen (DE); Van Beest Group B.V., AB Sliedrecht (NL)

( * ) Notice: Subject to any disclaimer, the term of this patent is extended or adjusted under 35 U.S.C. 154(b) by 158 days.

(21) Appl. No.: 16/316,441

(22) PCT Filed: Jul. 25, 2017

(86) PCT No.: PCT/DE2017/100618
§ 371 (c)(1),
(2) Date: Jan. 9, 2019

(87) PCT Pub. No.: WO2018/019333
PCT Pub. Date: Feb. 1, 2018

(65) Prior Publication Data
US 2019/0234488 A1    Aug. 1, 2019

(30) Foreign Application Priority Data
Jul. 27, 2016   (DE) ..................... 10 2016 113 897.5

(51) Int. Cl.
*F16G 15/06*   (2006.01)
(52) U.S. Cl.
CPC ................................... *F16G 15/06* (2013.01)
(58) Field of Classification Search
CPC .......... F16G 15/06; F16G 15/00; F16G 15/04; F16B 35/06; F16B 33/002; F16B 21/12; F16B 2021/14
(Continued)

(56) References Cited

U.S. PATENT DOCUMENTS 1,458,622 A  *  6/1923  Higgins .................. F16G 15/06
                                                     59/86
4,060,978 A  *  12/1977  McBain .................. F16G 13/00
                                                     59/78
4,100,729 A  *  7/1978  Bartoletto ............... F16G 15/06
                                                     403/274

(Continued)

FOREIGN PATENT DOCUMENTS

DE    19929392 A1  *  1/2001  ............. F16G 15/06
FR    1556406 A       2/1969

OTHER PUBLICATIONS

English translate (DE19929392A1), retrieved date Mar. 5, 2021.*
International Search Report of International Application PCT/DE2017/100618, Filed Jul. 25, 2017.

*Primary Examiner* — Adam J Eiseman
*Assistant Examiner* — Mohammed S. Alawadi
(74) *Attorney, Agent, or Firm* — Muncy, Geissler, Olds & Lowe, P.C.

(57) ABSTRACT

A heavy-duty shackle has a shackle body with two opposing end sections, each of which having a through-opening for receiving a bolt, which has a threaded section for a locknut at one end and a head at the other end, the head outer edge being non-circular. The through-openings are each surrounded by at least one nut bearing face, which is raised relative to a bearing face, directly surrounding the through-openings, for the head. An anti-rotation means for the bolt is formed in each case by a recessed head receptacle in the nut bearing face, the head outer edge being accommodated fully in the recess and being interlockingly held in place therein.

13 Claims, 4 Drawing Sheets

Figure 1:
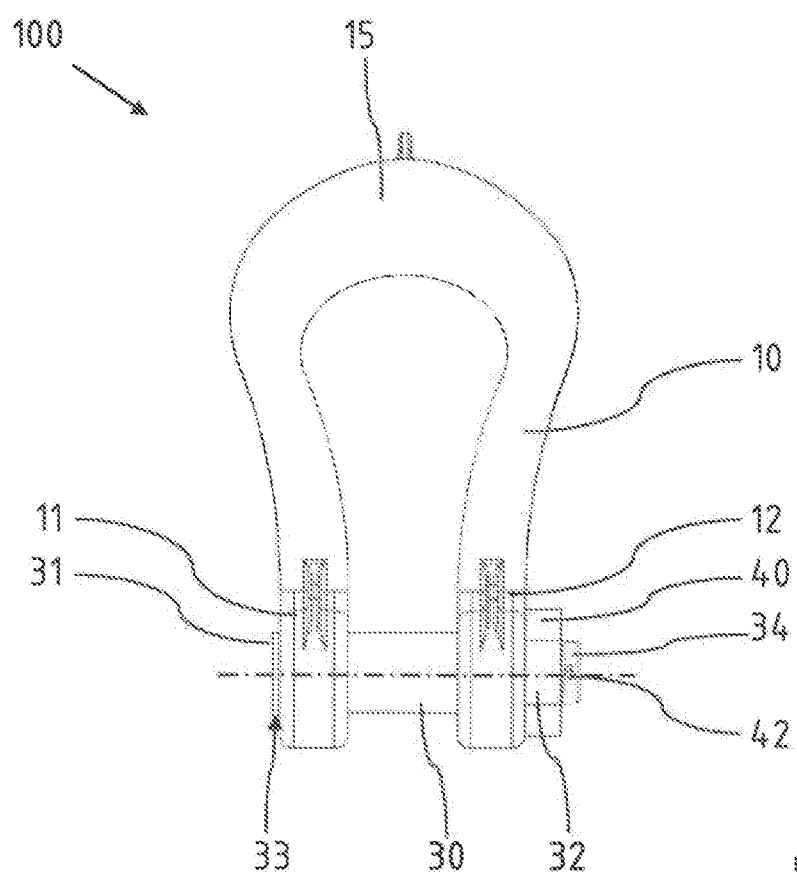

(58) Field of Classification Search
USPC .................................................. 411/166, 351
See application file for complete search history.

(56) References Cited

U.S. PATENT DOCUMENTS

| | | | | |
|---|---|---|---|---|
| 4,134,255 | A * | 1/1979 | McBain | F16G 13/00 59/78 |
| 4,759,177 | A * | 7/1988 | Brazell | F16G 15/06 24/339 |
| 5,103,755 | A * | 4/1992 | Garrett | F16G 15/06 116/200 |
| RE34,046 | E * | 9/1992 | Shahan | B21K 1/72 59/35.1 |
| 5,193,480 | A * | 3/1993 | Garrett | B66C 1/12 116/200 |
| 5,597,260 | A * | 1/1997 | Peterson | F16B 21/04 403/316 |
| 6,935,821 | B2 * | 8/2005 | Bodin | B25B 27/0007 411/29 |
| 7,393,033 | B1 * | 7/2008 | Bisso, IV | F16G 15/06 294/82.1 |
| 8,205,922 | B1 * | 6/2012 | Ohman, Jr. | F16G 15/06 294/82.11 |
| 9,121,422 | B2 * | 9/2015 | Sauer | F16B 5/02 |
| 9,482,315 | B1 * | 11/2016 | Dreixler | F16G 13/12 |
| 2009/0196683 | A1 * | 8/2009 | Lunn | F16G 15/06 403/154 |
| 2011/0265442 | A1 * | 11/2011 | Segura | B66C 1/10 59/86 |
| 2015/0101307 | A1 * | 4/2015 | Van Steijn | F16G 15/06 59/86 |
| 2015/0121836 | A1 | 5/2015 | Moreau et al. | |
| 2016/0002008 | A1 * | 1/2016 | Foley | F16G 11/146 294/215 |
| 2017/0341476 | A1 * | 11/2017 | Baker | B60D 1/187 |
| 2018/0274631 | A1 * | 9/2018 | Betzler | F16G 15/06 |

* cited by examiner

HEAVY-DUTY SHACKLE

The invention relates to a heavy-duty shackle with the features of the preamble of claim 1.

Heavy-duty shackles are used for lifting heavy loads or for connecting anchor chains, especially in offshore installations. Due to the large dimensions and the high mass of several hundred kilograms, of which the shackle bolt alone accounts for one third of the weight, the bolt can only be inserted with additional aids such as a crane. Depending on the situation, it may be necessary to insert the bolt from one side or the other into the already positioned shackle body. It is also possible that the threaded section of the bolt to which a locknut is to be attached is only accessible from one side, so that the shackle must first be turned 180° to allow the bolt to be inserted in the correct direction. This is difficult, at least time-consuming, due to the size and weight of the heavy-duty shackle and bolt. In order to prevent the bolt head from twisting and to avoid having to counter it with a second tool when tightening the nut, t is known to form the bolt head non-circular.

This means that at least one stop element can be attached to the outside of the shackle body next to the circumferential edge of the head or can be molded directly onto the shackle body during casting. As soon as the bolt is inserted into the shackle body, it will turn around its own axis at the latest when the lock nut is screwed on, so that the non-circular section of the circumferential edge of the head strikes a support edge of the anti-rotation means and further rotation of the bolt is prevented. However, the anti-rotation means formed by the stop elements projecting from the outside of the shackle body prevents the lock nut from being placed on that side because the rotation of the lock nut is either hampered by the stop elements or it will only be placed against the end sections selectively and will tilt. Effective securing of the bolt is thus not possible.

The problem addressed by the present invention is to improve a shackle of the type mentioned above so that the bolt can be inserted into the shackle body from both sides and that, regardless of the direction of insertion, an effective anti-rotation means is formed for the head and the lock nut can be screwed on without any problems.

This problem is solved by a heavy-duty shackle with the features of claim 1.

It is essential for the invention that a nut support surface is provided that is raised in relation to the anti-rotation means for the bolt head.

The nut support surface can be an endless annular ring surface which surrounds the through-openings and the anti-rotation means.

However, it can also be discontinuous and divided into at least three parts aligned at equal angles to each other.

If the nut support surface is formed on an elevation that is formed on the outer surfaces of the end sections, the receptacle for the bolt head can be located directly on the outer surface of the end sections.

However, it is also possible to provide a countersink in the surface which serves as a receptacle for the circumferential edge of the head, wherein the nut support surface is formed directly by the outer surface of the end section.

Figure 2:
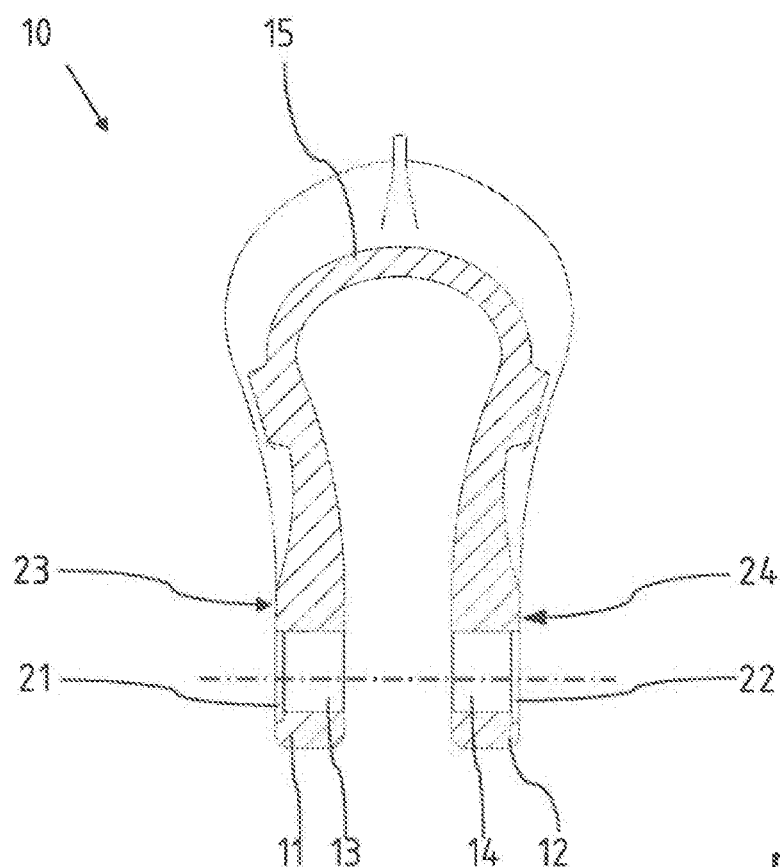
Figure 3:
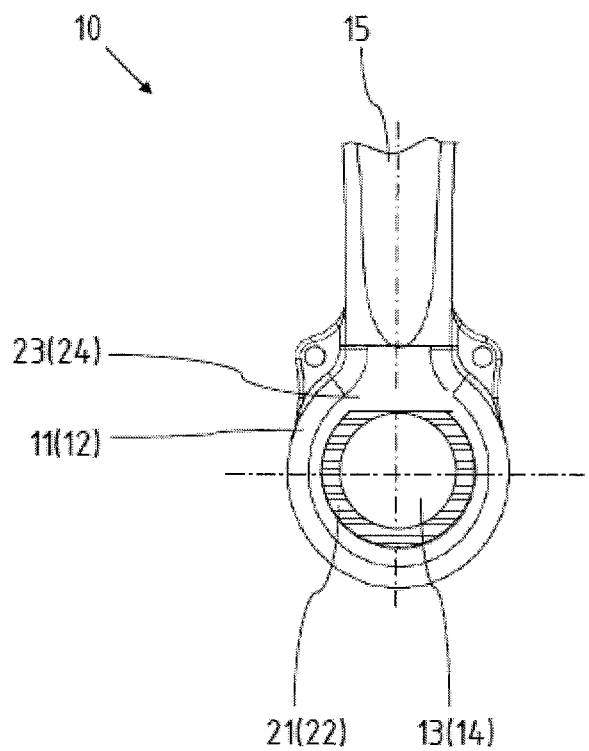
Figure 4:
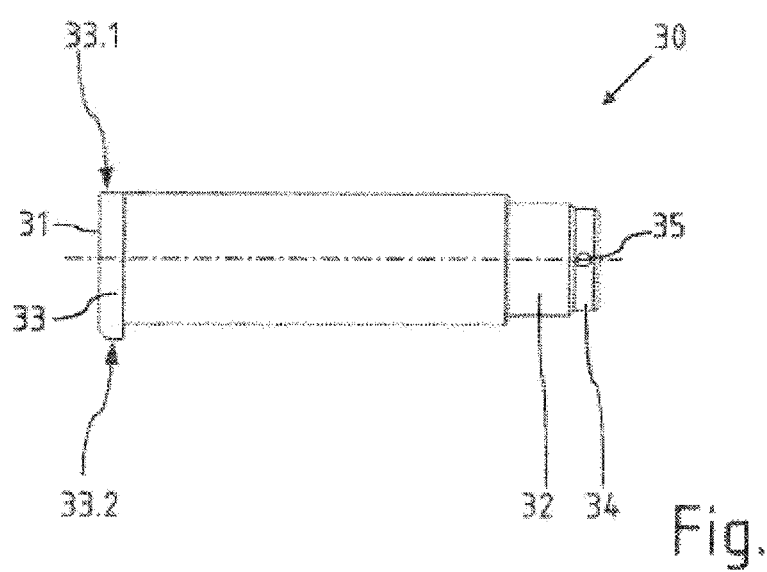
Figure 5:
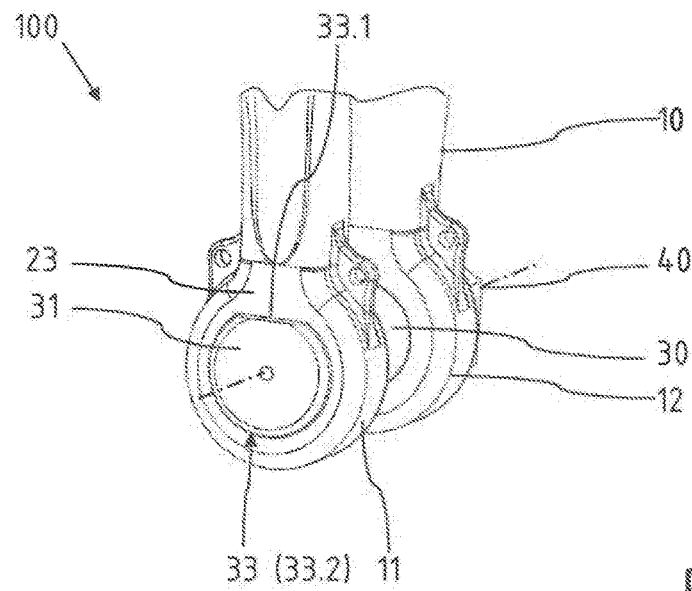
Figure 6:
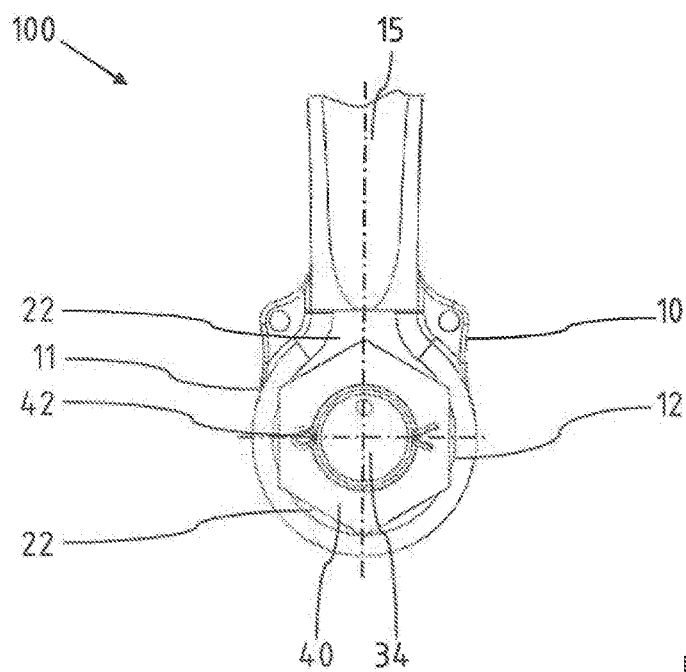

The invention is explained in greater detail below based on an exemplary embodiment and with reference to the drawings. The Figures show in detail:

FIG. 1 a heavy-duty shackle in front view;
FIG. 2 the shackle body in section;
FIG. 3 an end portion of the shackle body in a side view;
FIG. 4 the bolt in front view.
FIG. 5 a lower part of the heavy-duty shackle in a perspective view from the left;
FIG. 6 the lower part of the heavy-duty shackle in a side view from the right;

FIG. 1 shows a heavy-duty shackle 100 in front view. It essentially comprises a shackle body 10 and a bolt 30 inserted therein. The bolt 30 inserted in the shackle body 10 is secured by a lock nut 40.

In this exemplary embodiment, the shackle body 10 has an omega-shaped or horseshoe-shaped structure, which is essentially defined by an arc section 15 that ends in an end section 11, 12 on both sides. However, the structure of the shackle body 10 outside the end sections 11, 12 is irrelevant for the present invention.

The end sections 11, 12 each have aligned through-openings which are not visible here and through which the bolt 30 is inserted. The bolt 30 has a head 31 at its left end in FIG. 1, wherein the head 31 is almost completely countersunk in the illustration in FIG. 1 and only a small part of a circumferential edge 33 of the head still emerges. A thread 32 is formed on the bolt 30 at the other end, onto which the lock nut 40 is screwed. A further shoulder 34 is formed beyond the thread section 32, having a transverse hole in which a cotter pin 42 or another securing means for the lock nut 40 can be inserted.

FIG. 2 shows only the shackle body 10, i.e. without the bolt 30. In the exemplary embodiment shown, it is designed as a so-called rope sling shackle, also known as a wide body shackle. For this purpose, the shackle body 10 has a pronounced horseshoe or omega-shaped structure in the arc 15. In addition, the inner flanks in the arc 15 are highly rounded to form as large a radius as possible and a correspondingly wide support surface for a rope loop in which the heavy-duty shackle 100 is suspended.

The end sections 11, 12 have through-holes 13, 14, each of which has a recess 21, 22 designed as a bolt head receptacle on its outward facing sides. The recesses 21, 22 are surrounded by flat support surfaces 23, 24. No elements protrude beyond the outer surfaces of the end sections 11, 12 in the area of the support surfaces 23, 24. In particular, the anti-rotation means designed in the form of recesses 21, 22 does not hamper the flat support of the lock nut on the support surfaces 23, 24.

FIG. 3 shows a top view of one of the end sections 11 or 12. The non-circular recess 21 or 22, which serves as a receptacle for the head and for the creation of an anti-rotation means, is shown hatched; it surrounds the opening 13 or 14. Outside the recess 21 or 22, the flat support surface 23, 24 is designed for the lock nut, which is slightly raised in relation to the rest of the end sections 11, 12.

FIG. 4 shows in the bolt 30 with its end sections 32, 34 and the transverse hole 35 at the right end and the head 31 at the left end. A circumferential edge of the head 33 has a secant section 33.1 at the top and a circular arc section 33.2 at the bottom.

As can be seen from the side view on bolt 30 in FIG. 4, the circumferential line on the upper side merges directly into the secant section 33.1 on the head 31, i.e. there is no protrusion of the head 31 above the body of the bolt 310.

FIG. 5 shows a part of the shackle 100 with the bolt 30 in a perspective view onto the lower left half. It is essential for the invention that both the left end section 11 and the right end section 12 are designed identically so as to enable the bolt 30 to be inserted selectively from one side or the other and also to enable the inserted bolt to be secured on both sides without any problems. The identical design refers primarily to the recesses which form the receptacles for the bolt head 31 and the support surfaces 23 that surround the recesses for receiving the bolt head 31.

The support surface 23 is flat in itself and perpendicular to the center axis of the bolt 30. As already mentioned, the head 31 of the bolt 30 is not circular in shape in order to enable a positive anti-rotation means. in the preferred embodiment shown, it features the secant section 33.1, which interrupts a circular arc section 33.2. Both sections 33.1, 33.2 form the circumferential edge 33 of the head.

FIG. 6 shows a side view of the shackle 100 from the right with a view of the end shoulder 34 of the bolt 30. The lock nut 40 is placed and rests on the support surface 22 of the right end section 12. It is secured using a cotter pin 42.

The invention claimed is:

1. A heavy-duty shackle, comprising:
    a shackle body having two opposite end sections each with a through-opening and the shackle body having a central arc extending between the end sections, wherein the through-openings of the end sections are aligned;
    a bolt inserted in the through-openings and having a threaded portion with a lock nut at one end and a head at the other end, wherein a circumferential edge of the head of the bolt is non-circular;
    wherein the through-openings are each directly surrounded by at least one recessed head receptacle that forms an anti-rotation lock, wherein the recessed head receptacle is recessed within a nut support surface that is arranged on an outside of each of the end sections, and wherein the non-circular circumferential edge of the head of the bolt is positively fixed in the recessed head receptacle,
    wherein a bottom surface of the lock nut, which faces the head of the bolt, directly contacts and is supported by the nut support surface which surrounds the recessed head receptacle, wherein the circumferential edge extends around an entire periphery of the head of the bolt and consists of a single straight secant portion and a single circular arc portion, and wherein the single circular arc portion connects to ends of the single straight secant portion.

2. The heavy-duty shackle of claim 1, wherein an outer contour of the circumferential edge of the head and an inner contour of the recessed head receptacle are identical and offset from one another by a gap width.

3. The heavy-duty shackle of claim 2, wherein the nut support surface is smooth and is part of an outer surface of each respective one of the end sections.

4. The heavy-duty shackle of claim 3, wherein the nut support surface is formed on a web or hump which is raised relative to the outer surface of each respective one of the end sections.

5. The heavy-duty shackle of claim 1, wherein the nut support surface is smooth and is part of an outer surface of each respective one of the end sections.

6. The heavy-duty shackle of claim 5, wherein the nut support surface is formed on a web or hump which is designed to be raised relative to the outer surface of each respective one of the end sections.

7. The heavy-duty shackle of claim 1, wherein the nut support surface is formed on a web or hump which is raised relative to the outer surface of each respective one of the end sections.

8. The heavy-duty shackle of claim 1, wherein an outer contour of the circumferential edge of the head and an inner contour of the recessed head receptacle are identical and offset from one another by a gap width.

9. The heavy-duty shackle of claim 8, wherein the nut support surface is smooth and is part of an outer surface of each respective one of the end sections.

10. The heavy-duty shackle of claim 9, wherein the nut support surface is formed on a web or hump which is raised relative to the outer surface of each respective one of the end sections.

11. The heavy-duty shackle of claim 1, wherein the nut support surface is smooth and is part of an outer surface of each respective one of the end sections.

12. The heavy-duty shackle of claim 11, wherein the nut support surface is formed on a web or hump which is raised relative to the outer surface of each respective one of the end sections.

13. The heavy-duty shackle of claim 1, wherein the nut support surface is formed on a web or hump which is raised relative to the outer surface of each respective one of the end sections.

* * * * *